Figure 1:
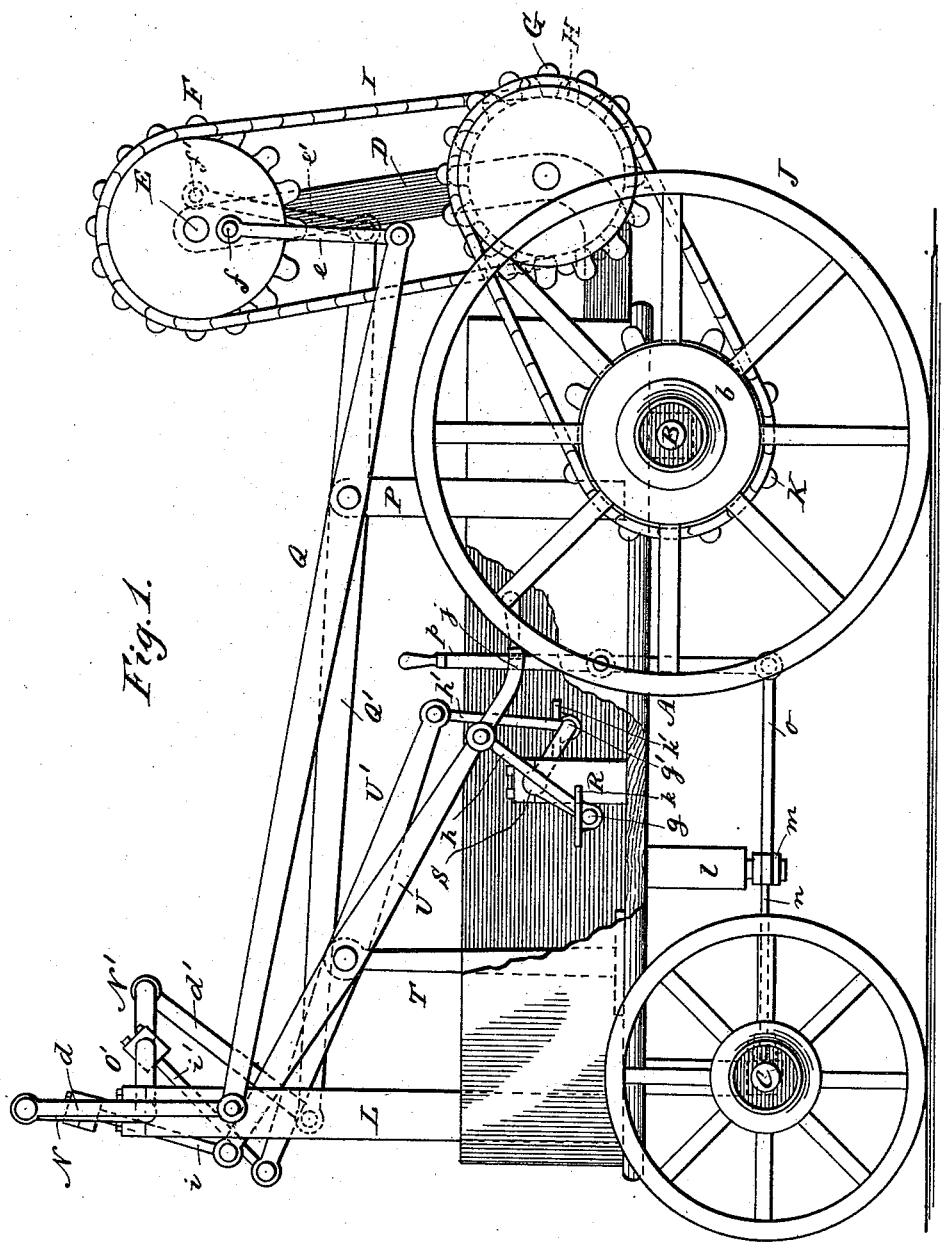

(No Model.)

2 Sheets—Sheet 1.

J. POTTER.
MOTOR FOR VEHICLES.

No. 408,430. Patented Aug. 6, 1889.

WITNESSES:
D. C. Reusch.
C. Sedgwick

INVENTOR
J. Potter
BY
Munn & Co.
ATTORNEY

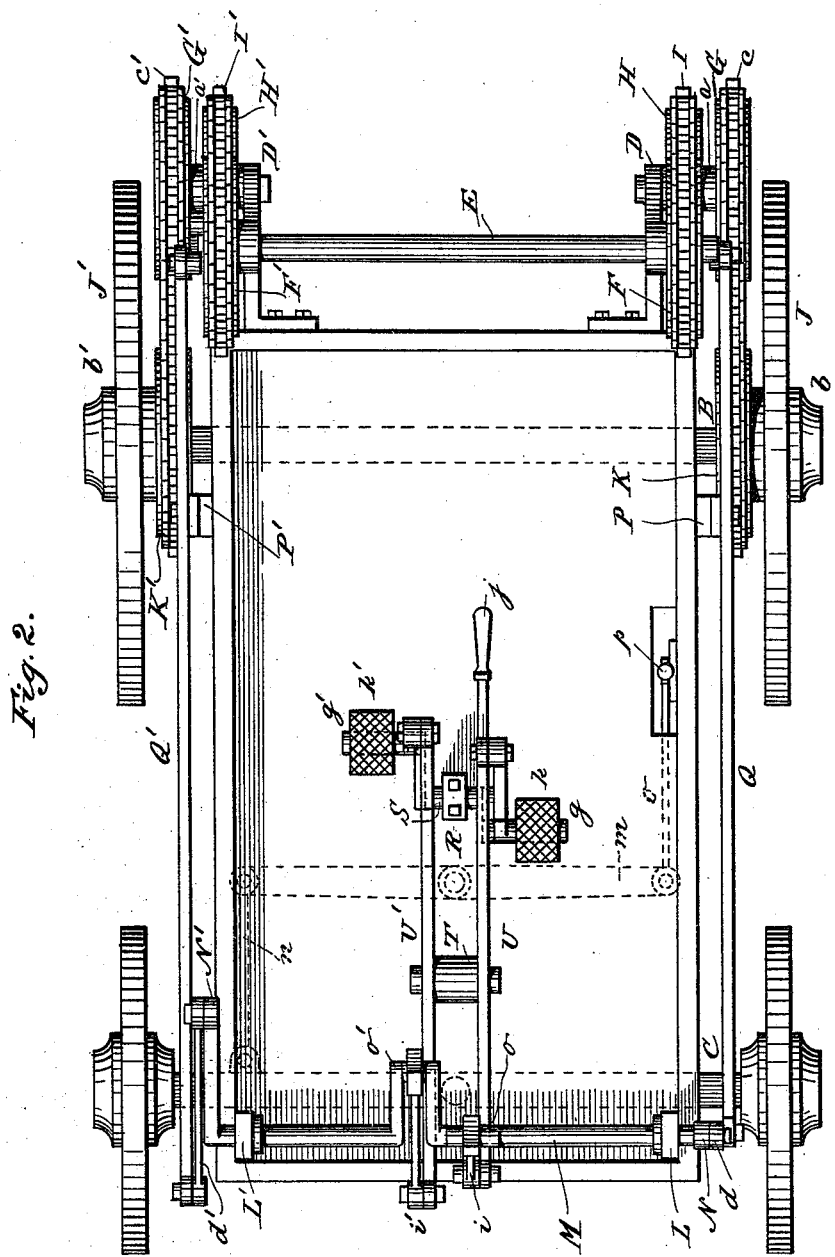

UNITED STATES PATENT OFFICE.

JONAS POTTER, OF JOHNSTOWN, PENNSYLVANIA.

MOTOR FOR VEHICLES.

SPECIFICATION forming part of Letters Patent No. 408,430, dated August 6, 1889.

Application filed February 7, 1889. Serial No. 298,990. (No model.)

*To all whom it may concern:*

Be it known that I, JONAS POTTER, of Johnstown, in the county of Cambria and State of Pennsylvania, have invented a new and Improved Motor, of which the following is a specification, reference being had to the annexed drawings, forming a part thereof, in which—

Figure 1 is a side elevation, partly in section, of my improved motor; and Fig. 2 is a plan view.

Similar letters of reference indicate corresponding parts in both views.

The object of my invention is to construct a motor for application to all kinds of machinery and for use in connection with prime movers for increasing their efficiency.

My invention consists in the combination of long and short levers and of sprocket or gear wheels for transmitting the power of the prime movers to the mechanism in which the power is utilized.

In the present case I have shown my improved motor applied to a wagon; but I do not limit or confine myself to this use.

The wagon-body A is mounted upon the rear axle B and upon the forward swiveled axle C in the usual way. At the rear end of the wagon-body are secured two angled arms D D', in the upper ends of which is journaled a shaft E. Upon the ends of the said shaft E are secured sprocket-wheels F F', and upon studs projecting from the arms D D', near their junction with the body A, are journaled the sprocket-wheels G G' H H', the sprocket-wheels G H upon one side of the vehicle being connected together by a sleeve $a$, the sprocket-wheels G' H' on the opposite side being connected together in a similar way by the sleeve $a'$. An endless chain I connects the sprocket-wheels F H, and an endless chain I' connects the sprocket-wheels F' H'. To the hubs $b\ b'$ of the rear wheels J J' are secured sprocket-wheels K K', which are connected to the sprocket-wheels G G' by the chains $c\ c'$, so that when the shaft E is turned in the manner presently to be described motion will be imparted through the sprocket-wheels and chains to the wheels J J'.

The forward part of the wagon-body A is provided with standards L L', in which is journaled the crank-shaft M, the said crank-shaft being provided at its ends with cranks N N' and at intermediate points with the cranks O O'. The cranks N N' are arranged at right angles to each other, and the cranks O O' are also arranged at right angles to each other, the cranks N O being in the same plane and the cranks N' O' being arranged in a plane at right angles to the cranks N O.

To standards P P' are pivoted the levers Q Q', the longer arms of the levers extending forward toward the front end of the vehicle, where they are connected by rods $d\ d'$ with the cranks N N'. The rear and shorter arms of the said levers Q and Q' are connected by rods $e\ e'$ with crank-pins $f f'$, projecting from the outer faces of the sprocket-wheels F F' and arranged at right angles to each other.

In the upper end of the standard R, near the center of the wagon-body, is journaled a crank-shaft S, provided with two cranks $g\ g'$, which are arranged at right angles to each other, and to a standard T, near the forward end of the body A, are pivoted levers U U', the longer arms of which extend rearwardly and are connected with the cranks $g\ g'$ by the connecting-rods $h\ h'$, while the forward ends of the said levers are connected with the cranks O O' by the rods $i\ i'$. The rear end of the lever U is prolonged, forming a handle $j$, by which the said lever may be operated by hand. The cranks $g\ g'$ are provided with foot-pedals $k\ k'$, by which the feet may be made to assist in propelling the device, when desired.

To a stud $l$, projecting from the under surface of the wagon-body A, is pivoted the lever $m$, one end of which is connected with the axle C by a rod $n$, the other end being connected by the rod $o$ with a hand steering-lever $p$, pivoted to the side of the body A and extending upward to a point within easy reach of the operator of the motor.

By means of my improvement great advantage is secured by leverage. The shorter arms of the levers U U', acting upon the cranks O O', revolve the shaft M, and the long cranks N N', acting upon the longer arms of the levers Q Q', cause the said levers to be oscillated in alternation, and the oscillatory motion of the said levers is converted into rotary motion by virtue of their connection with the sprocket-wheels F F'. The power being thus increased, I am enabled to increase the speed of the rear wheels by transferring the motion of the large sprocket-wheels F F' to the small wheels H H', and to communicate motion from the larger sprocket-wheels G G' to the sprocket-wheels K K' on the hubs of the wheels J J'.

It is obvious that spur-gearing may be substituted for the chains and sprocket-wheels.

Having thus described my invention, I claim as new and desire to secure by Letters Patent—

1. In a motor, the combination of the crank-shaft S, provided with the cranks $g\ g'$ and foot-pedals $k\ k'$, the levers U U', the crank-shaft M, having the cranks N N' O O', the levers Q Q', the sprocket-wheels F F', provided with the crank-pins $f\ f'$, the sprocket-wheels H H', the chains I I', the sprocket-wheels G G', the chains $c\ c'$, and the sprocket-wheels K K', substantially as specified.

2. In a motor, the combination of the crank-shaft S, provided with cranks G G', the levers U U', the lever U being provided with the prolongation $j$, the crank-shaft M, having the cranks N N' O O', the levers Q Q', the sprocket-wheels F F', provided with the crank-pins $f\ f'$, the sprocket-wheels H H', the chains I I', the sprocket-wheels G G', the chains $c\ c'$, and the sprocket-wheels K K', substantially as specified.

3. The combination, with the body A and front axle C, of the lever $m$, pivoted to the under surface of the body, the hand-lever $p$, the rod $n$, connecting one end of lever $m$ to the axle, and the rod $o$, connecting the other end of the said lever $m$ to the hand-lever $p$, substantially as described.

JONAS POTTER.

Witnesses:
A. MONTGOMERY,
A. B. PETRIKIN.